(12) United States Patent
Cohen et al.

(10) Patent No.: US 7,562,019 B2
(45) Date of Patent: Jul. 14, 2009

(54) AUTOMATED TESTING OF VOICE RECOGNITION SOFTWARE

(75) Inventors: Jordan Cohen, Gloucester, MA (US); William Barton, Harvard, MA (US); John Ploumis, Brockton, MA (US); Douglas J. Ely, North Andover, MA (US)

(73) Assignee: Voice Signal Technologies, Inc., Burlington, MA (US)

( * ) Notice: Subject to any disclaimer, the term of this patent is extended or adjusted under 35 U.S.C. 154(b) by 732 days.

(21) Appl. No.: 11/031,955

(22) Filed: Jan. 7, 2005

(65) Prior Publication Data

US 2005/0197836 A1 Sep. 8, 2005

Related U.S. Application Data

(60) Provisional application No. 60/534,942, filed on Jan. 8, 2004.

(51) Int. Cl.
*G06F 11/00* (2006.01)
*G06F 21/00* (2006.01)

(52) U.S. Cl. .................. 704/270; 704/231; 704/243

(58) Field of Classification Search ................ None
See application file for complete search history.

(56) References Cited

U.S. PATENT DOCUMENTS

| | | | |
|---|---|---|---|
| 4,596,038 A | 6/1986 | Yoshida | |
| 5,101,429 A | 3/1992 | Geboers | |
| 5,715,369 A | 2/1998 | Spoltman et al. | |
| 6,421,793 B1 | 7/2002 | Lester et al. | |
| 6,622,121 B1 | 9/2003 | Crepy et al. | |
| 6,728,612 B1 | 4/2004 | Carver et al. | |
| 6,763,360 B2 | 7/2004 | Hartley | |
| 7,003,459 B1 | 2/2006 | Gorin et al. | |
| 7,016,842 B2 * | 3/2006 | Mills | .......................... 704/270 |
| 2002/0069064 A1 | 6/2002 | Dejaco et al. | |
| 2003/0236672 A1 | 12/2003 | Aaron et al. | |

FOREIGN PATENT DOCUMENTS

WO      WO 00/46793      8/2000

OTHER PUBLICATIONS

Vause et al., "Speech Intelligibility in Adverse Conditions in Recorded Virtual Auditory Environments", The Fifth☐☐International Conference on Auditory Display, ICAD '98, University of Glasgow, UK, Nov. 1-4, 1998.*

Campbell, et al., "Corpora for the evaluation of speaker recognition systems", IEEE International Conference on Acoustics, Speech, and Signal Processing, pp. 829-832, vol. 2, Mar. 15-19, 1999.*

(Continued)

*Primary Examiner*—David R Hudspeth
*Assistant Examiner*—Brian L Albertalli
(74) *Attorney, Agent, or Firm*—Chapin IP Law, LLC (57) ABSTRACT

A method and a system for testing a voice enabled application on a target device, the method including conducting one or more interactions with the target device, at least some of the interactions including presenting an acoustic utterance in an acoustic environment to the target device, receiving an output of the target device in response to the acoustic utterance, and comparing the output to an output expected from the acoustic utterance.

45 Claims, 10 Drawing Sheets

OTHER PUBLICATIONS

International Search Report and Written Opinion of the International Searching Authority, Patent Cooperation Treaty, International Application No. PCT/US05/00507, Oct. 25, 2006, 17 pages.

Supplementary European Search Report dated Jul. 10, 2008. European Application No. EP 05 70 5265, 5 pages.

* cited by examiner

AUTOMATED TESTING OF VOICE RECOGNITION SOFTWARE

CROSS-REFERENCE TO RELATED APPLICATIONS

This application claims priority to U.S. Provisional Application Ser. No. 60/534,942, filed on Jan. 8, 2004, incorporated herein by reference.

TECHNICAL FIELD

This invention relates to automated testing of voice enabled devices.

BACKGROUND

Interfaces for portable electronic devices, as well as computers in general, are increasingly being enhanced by voice recognition software. This voice recognition software often enables users to interact with the portable electronic devices and computers in a more efficient manner than by punching keys in keypads or keyboards. In the case of portable electronic devices such as cell phones and personal digital assistants (PDA), these devices often have keypads that are small so voice recognition software can facilitate better interaction with the user. For cell phones, voice recognition can be used for applications such as recognition of a user's utterances of a name of a person in a cell phone's directory or recognition of utterances of a phone number to be dialed.

In general, voice enabled applications can support digit recognition, speaker dependent (trained) name recognition, speaker independent name recognition (names from a phonebook), spelling recognition for data entry, Uniform Resource Locator (URL) recognition for use in an Internet browser (recognize the active links in a page), speech-to-text for Short Message Service (SMS) messaging, speech-to-text for Instant Messaging, fill-in-the-blank recognition for database query using a browser, and command recognition for any command-and-control application.

It is desirable to test software-based products before they are commercially distributed or even before they are deployed in field tests. However, some problems in the software for target devices are often discovered only by doing field tests of the product and each cycle of field tests adds to the expense of the product. Such field tests attempt to approximate the usage environment of the product.

Software applications on portable electronic devices and computers run in coordination with physical hardware, an operating system, and other applications in addition to a user. The physical hardware, an operating system, other applications, and the user all have variability that must be tested in coordination with the software application. In particular, portable electronic devices have physical hardware that can sometimes change as quickly as software applications on the portable electronic devices.

SUMMARY

Voice enabled devices, which may allow multiple modalities of inputs and outputs, pose some unique challenges to test. Furthermore, it can be desirable to test the devices in conditions that closely approximate the operating conditions in which the devices will be used. It can also desirable to perform system-level tests of all (or at least multiple) of the components as they are integrated in the system.

Voice input, in contrast to, for example, keyboard inputs, can introduce greater testing complexity due to variability associated with recognizing input utterances, for example of persons with different accents and in different background noises conditions. Thus, it can be important to test voice recognition software to be deployed on target devices in testing conditions that closely approximate the operating conditions with which the voice recognition software will be deployed.

In one aspect, the invention features a method for testing a voice enabled application on a target device, the method including conducting one or more interactions with the target device, at least some of the interactions including presenting an acoustic utterance in an acoustic environment to the target device, receiving an output of the target device in response to the acoustic utterance, and comparing the output to an output expected from the acoustic utterance.

Embodiments may include one or more of the following. The acoustic utterance and the expected output are further determined by simulating a dialog with a user of the application on the target device. The dialog has a plurality of allowable interactions. At least some of the interactions include providing a keyboard input to the target device. The keyboard input is an electrical communications signal to the target device. The keyboard input is a mechanical input, such as a mechanical-pneumatic force exerted on buttons of the target device. Receiving the output further includes receiving an electric communications signal, or an acoustic or optical signal, from the target device. For example, receiving the output includes receiving an image of alphanumeric characters from the target device, in some examples, the method further includes processing and recognizing the image of alphanumeric characters from the target device.

Embodiments may also include one or more of the following. Receiving the output further includes receiving an acoustic output from the target device. In some cases, the method further includes processing and recognizing the acoustic output from the target device. Presenting the acoustic utterance further includes generating the acoustic utterance using an acoustic speaker. In some cases, the speaker is an artificial human mouth. In other cases, the acoustic environment comprises an acoustic noise source, the acoustic noise source replicating one or more noises of a real environment. In other cases, the method further includes recording the acoustic utterance, preferably, recording the acoustic utterance further includes recording the acoustic utterance in one of: a car, an airport, an office, a shaking room, and a quiet room. Recording the acoustic utterance further includes recording the acoustic utterance of a person using a microphone, preferably, the microphone is one of: an in-device microphone, a headset boom microphone, a headset dangling microphone, and a car kit microphone. The person utters the acoustic utterance while the microphone is shaking. The person utters the acoustic utterance while the person varies his or her position relative to the microphone.

Embodiments may also include one or more of the following. The target device is a cell phone or a personal digital assistant. The target device is a desktop computer.

In another aspect, the invention features a method for testing a voice enabled application on a target device, the method including testing and verifying algorithms for the voice enabled application offline of the target device, testing the application on a simulator of the target device, testing components of the application on the target device, testing the application on the target device for accuracy and performance in simulated real world environments, and distributing target devices to real users and observing application behavior and user experience.

In another aspect, the invention features a system for testing a voice enabled application on a target device, the system including the target device, a speaker configured to send sound to the target device, and a computer configured to conduct one or more interactions with the target device, at least some of the interactions including sending commands to the target device and receiving communications from the target device.

Embodiments may include one or more of the following. The system further includes a real or simulated noise source. At least some of the interactions include presenting an acoustic utterance in an acoustic environment to the target device, receiving an output of the target device in response to the acoustic utterance, and comparing the output to an output expected from the acoustic utterance. The acoustic utterance and the expected output are further determined by simulating a dialog with a user of the application on the target device. The dialog has a plurality of allowable interactions. The target device is a cell phone or a personal digital assistant. The target device is a desktop computer. Sending commands includes sending a keyboard input to the target device, preferably the keyboard input is an electrical communications signal to the target device. The keyboard input is a mechanical-pneumatic force exerted on buttons of the target device. Receiving the output further includes receiving an electric communications signal from the target device. Receiving the output further includes receiving an image of alphanumeric characters from the target device, preferably, at least some of the interactions further include processing and recognizing the image of alphanumeric characters from the target device. Receiving the output further includes receiving an acoustic output from the target device. At least some of the interactions further include processing and recognizing the acoustic output from the target device. Presenting the acoustic utterance further includes generating the acoustic utterance using an acoustic speaker, preferably, the speaker is an artificial human mouth. The acoustic environment includes an acoustic noise source, the acoustic noise source replicating one or more noises of a real environment. Presenting the acoustic utterance further includes recording the acoustic utterance, preferably, recording the acoustic utterance further includes recording the acoustic utterance in one of: a car, an airport, an office, a shaking room, and a quiet room. In other cases, recording the acoustic utterance further includes recording the acoustic utterance of a person using a microphone. In some of these cases, the microphone is one of: an in-device microphone, a headset boom microphone, a headset dangling microphone, and a car kit microphone. The person utters the acoustic utterance while the microphone is shaking. The person utters the acoustic utterance while the person varies his or her position relative to the microphone.

One or more embodiments of the invention have the following advantage. Voice recognition software can be tested as it runs on a target device with realistic acoustic conditions for input utterances.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
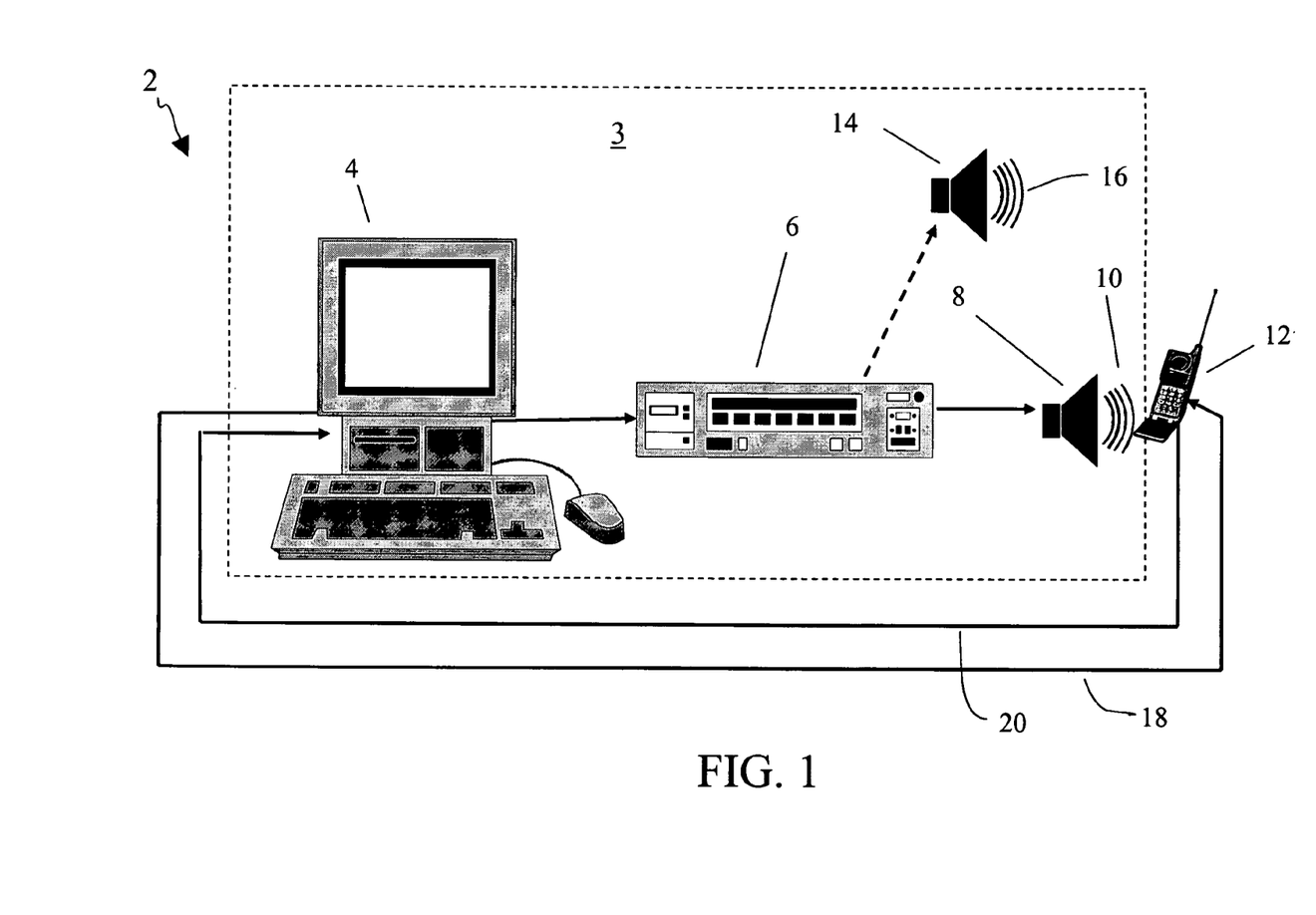
FIG. 1 is an iconic block diagram of a system for testing voice recognition software on a cell phone.

Referring to FIG. 1, a testing environment 2 is used to test voice enabled applications that that make use of a cell phone 12. The environment 2 includes a testing system 3 that is interfaced to the cell phone 12. Although described in the context of testing applications that are hosted on the cell phone 12, the testing system or a variant of it can be used to test voice enabled applications on other devices such as personal digital assistants (PDAs), computer laptops or workstations, or consumer, military or other devices. Also, the device that is coupled to the testing system does not necessarily host the entire application—for example it may provide a user interface to an application that is executed remotely to the device.

The testing system 3 does automated testing of various aspects of performance of the voice-enabled applications on the cell phone 12. Aspects of this performance can include voice recognition accuracy and performance characteristics such as response speed. When testing accuracy of the voice recognition component of the applications, the testing system is able to analyze errors over thousands of utterances in a controlled, repeatable environment. The testing optionally includes emulation of any real-world acoustic environment allowing comparison of results with results of algorithmic testing that may have been performed prior to deploying the voice recognition component.

The testing system 3 tests the voice enabled application on the cell phone 12 by automatically emulating sequences of user interactions with the cell phone 12 and recording the results. Because voice enabled applications on cell phones typically allow mixed modes of input, using voice and using keyboard input, the testing system 3 supports emulation of both voice and keyboard input modes. For example, the testing system 3 can use a speaker to emulate a person speaking uttered commands to the cell phone 12. Similarly, some voice enabled applications allow mixed modes of output, using graphical display output as well as acoustic output (e.g., prompts), and therefore the testing system 3 supports both output modes. Not all input and output modes are necessarily supported in all versions of the testing system 3.

The emulation of voice input includes emulating different acoustic environments that can affect the performance of voice recognition software on the cell phone 12. The testing system 3 allows many different possible sequences of interactions with the cell phone 12 to be automatically tested with many different possible acoustic variations. These acoustic variations can emulate noisy backgrounds where a user might be while using the cell phone 12. This testing can detect problems in the voice recognition software's deployment in the cell phone 12 without significant human involvement. The sequences of interactions with the cell phone 12 are programmed in the testing system 3 and reflect possible sequences of interactions of a user using applications on the cell phone 12.

The testing system 3 supports emulation of user interactions with the cell phone 12 that include voice input by providing recorded utterances to be recognized by voice recognition software on the cell phone 12. In one mode of operation, the testing system 3 uses a speaker 8 to create an acoustic signal 10 of the recorded utterance, which is transmitted acoustically to a microphone on the cell phone 12. In another mode of operation, the testing system 3 transmits an electrical signal to an electrical connector (for example, a connector for an external microphone) on the cell phone 12 to provide the voice input.

The testing system 3 also supports emulation of user interactions that include button presses. Thus, the testing system 3 simulates key (or button) strokes on the cell phone 12 through electronic communications transmission or direct mechanical pushing of keys. These interactions also include receiving responses from the cell phone 12 in the form of images of the cell phone 12's screen or reading electronic communications transmission from the cell phone 12. Receiving responses from the cell phone 12 can also take the form of automatically recognizing audio utterances from the cell phone 12 in the form of audio output. The testing system 3 also supports processing screen output, either by image processing or by electrical output.

The testing system 3 includes a computer 4, an audio amplifier 6, and a speaker 8. The computer 4 executes testing software designed to test applications on the cell phone 12. The computer 4 uses a sound card to play the recorded utterances in the form of voice audio files. The sound card is connected to the audio amplifier 6. The audio amplifier 6 is connected to a speaker 8. The speaker 8 can be an artificial mouth that is capable of reproducing sound 10 from electrical signals where the sound is similar to sound produced by human mouths. Such an artificial mouth is available as "Model 4227 Mouth Simulator" from Bruel and Kjaer of Nærum, Denmark. The testing system 3 also can include a noise source 14 that emits sound 16. In some cases, the noise source 14 is a speaker and the sound 16 emulates different types of noise that the cell phone 12 can be exposed to in addition to the sound of a user's utterances. In these cases, the noise source 14 is connected to the audio amplifier 6 and the computer 4 plays additional audio files with environmental noises through the audio amplifier 6 and the noise source 14. In other cases, the environment 2 is a realistic noisy environment and the noise source 14 is provided by the noise of the environment 2. For example, the testing environment 2 can be inside a car or inside an airport and these environments provide the noise source 14.

The testing environment 2 includes connection 18 from the computer 4 to the cell phone 12. The connection 18 is a representation of transmission of commands or data from the computer 4 to the cell phone 12 using one or more modalities. These commands or data emulate commands or data that are input to the cell phone 12 by a user. The connection 18 can be a wire or wireless (e.g., infrared or radio frequency) communications link for transmitting commands or data to the cell phone 12. This communications link can use any form of serial (e.g., RS-232) or parallel (HPIB) communications protocol. The connection 18 can also be a link for transmitting utterances in the form of electronic audio signals to the cell phone 12.

The testing environment 2 also includes connection 20 from the cell phone 12 to the computer 4. The connection 20 is used to receive data and requests for data from the cell phone 12 during testing of a voice enabled application. Processing the data and requests for data emulates a user processing the data and requests for data from the cell phone 12. The data and requests for data would normally be communicated to a user using the voice enabled application. The connection 20 can be the same communications line as the connection 18. In other cases, the connection 20 is a machine utterance by the cell phone 12. The machine utterance is received by the computer 4 and recognized by the testing software.

The testing environment 2 includes many different modalities of interaction between the testing system 3 and the cell phone 12. These modalities, as described previously, include sound, mechanical button pressing, electronic communication, etc. In practice, not all tests using the testing environment 2 will use all of these modalities. Tests can depend on the input/output capabilities of particular cell phones 12.

The test environment 2 can introduce variability in the testing of voice-enabled applications on cell phone 12. For example, the test environment can be outside or inside. By having the test environment 2 outside, the effects of different outside weather conditions (e.g., cold weather) on the functionality and performance of voice-enabled applications on cell phone 12 can be tested. The effects of other conditions such as degraded radio environments that disconnect cell phone calls can also be tested for their impact on the functionality and performance of voice-enabled applications on cell phone 12.

Figure 1A:
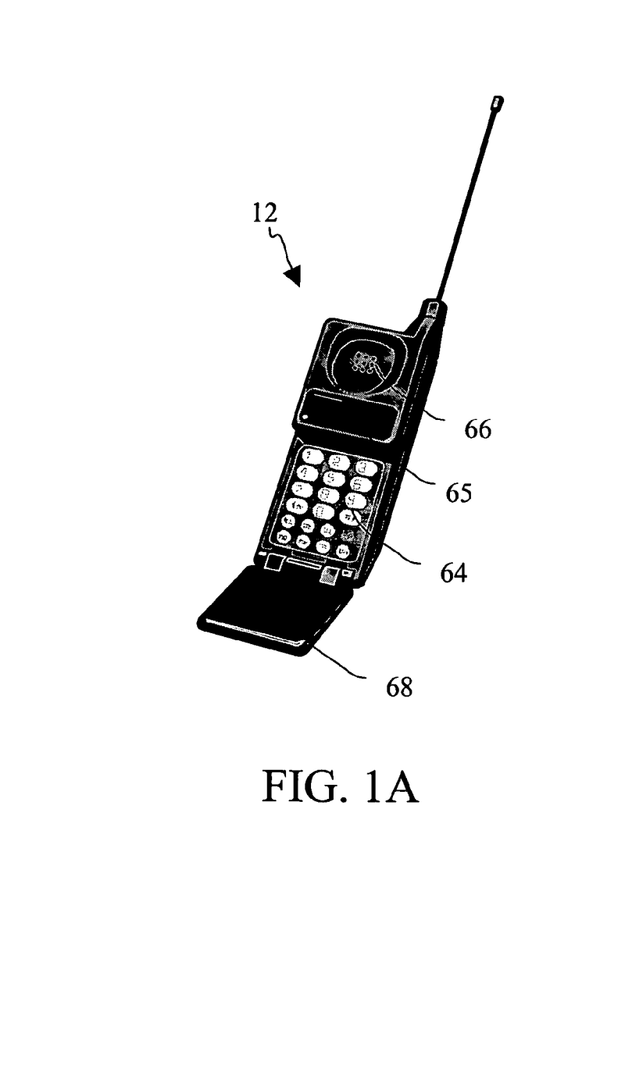
FIG. 1A is a view of a cell phone.

Referring to FIG. 1A, the cell phone 12 includes a keypad 64, a display 65, a speaker 66, and a microphone 68. Display 65 can display alphanumeric characters. A user of the cell phone 12 could typically speak into the microphone 68, type on keys on the keypad 64, looks at the display 65, and listen to sounds generated by the cell phone 12 through the speaker 66.

Figure 1B:
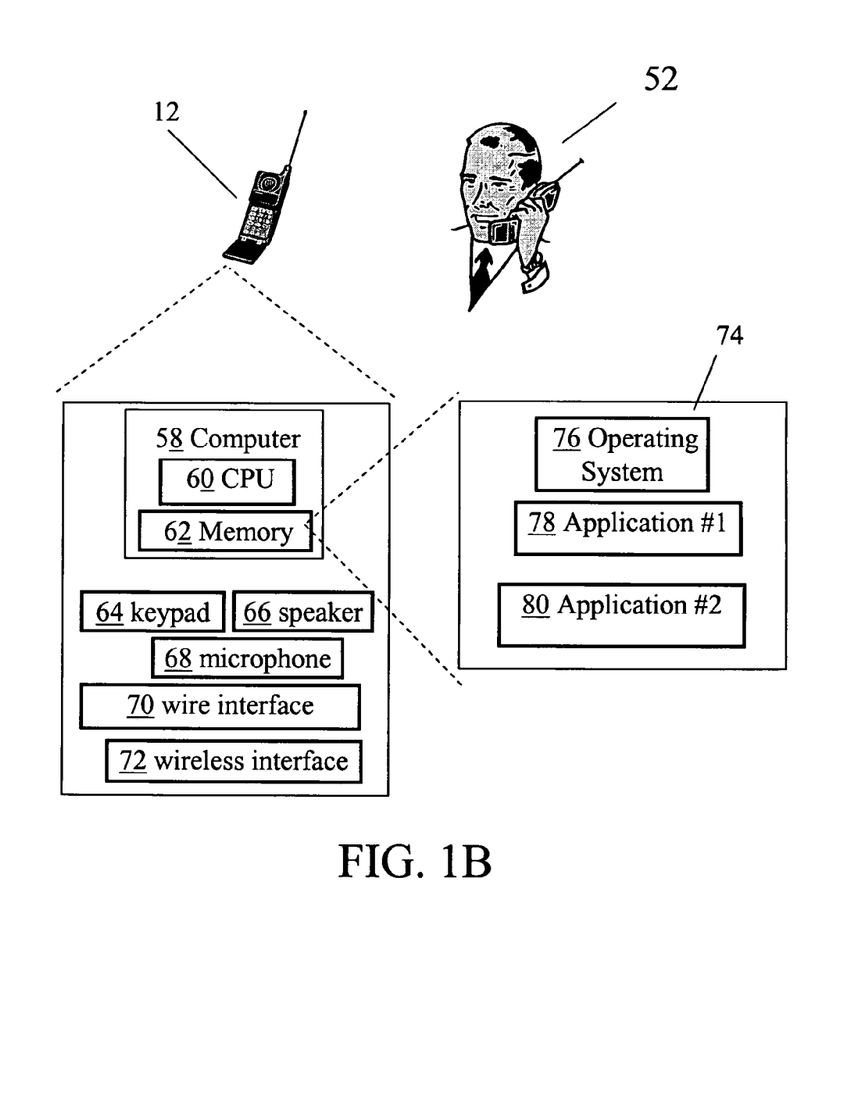
FIG. 1B is a view of a cell phone, its components, and a user.

Referring to FIG. 1B, the cell phone 12 includes a computer 58 having a central processing unit (CPU) 60 and memory 62. The memory 62 stores an operating system 76, and applications 78 and 80. The applications 78 and 80 can be enhanced with voice recognition software. A user 52 interacts with the applications 78 and 80 executing the cell phone 12.

Examples of operating system 76 include proprietary systems from major vendors such as Qualcomm, Motorola, Siemens, Symbian for smart phones, Pocket PC for phone/PDA combinations, Series 60 for smart phones from Nokia, RIM proprietary operating system, JAVA for smart phones, BREW (a proprietary Binary Runtime Environment for Wireless) on phones using Qualcomm operating systems on certified networks. BREW can be provided by Verizon.

Examples of voice recognition used by applications 78 and 80 include digit recognition, speaker dependent (trained) name recognition, speaker independent name recognition (names from a phonebook), spelling recognition for data entry, Uniform Resource Locator (URL) recognition for use in an Internet browser (recognize the active links in a page), speech-to-text for Short Message Service (SMS) messaging, speech-to-text for Instant Messaging, fill-in-the-blank recognition for database query using a browser, and command recognition for any command-and-control application.

Figure 2:
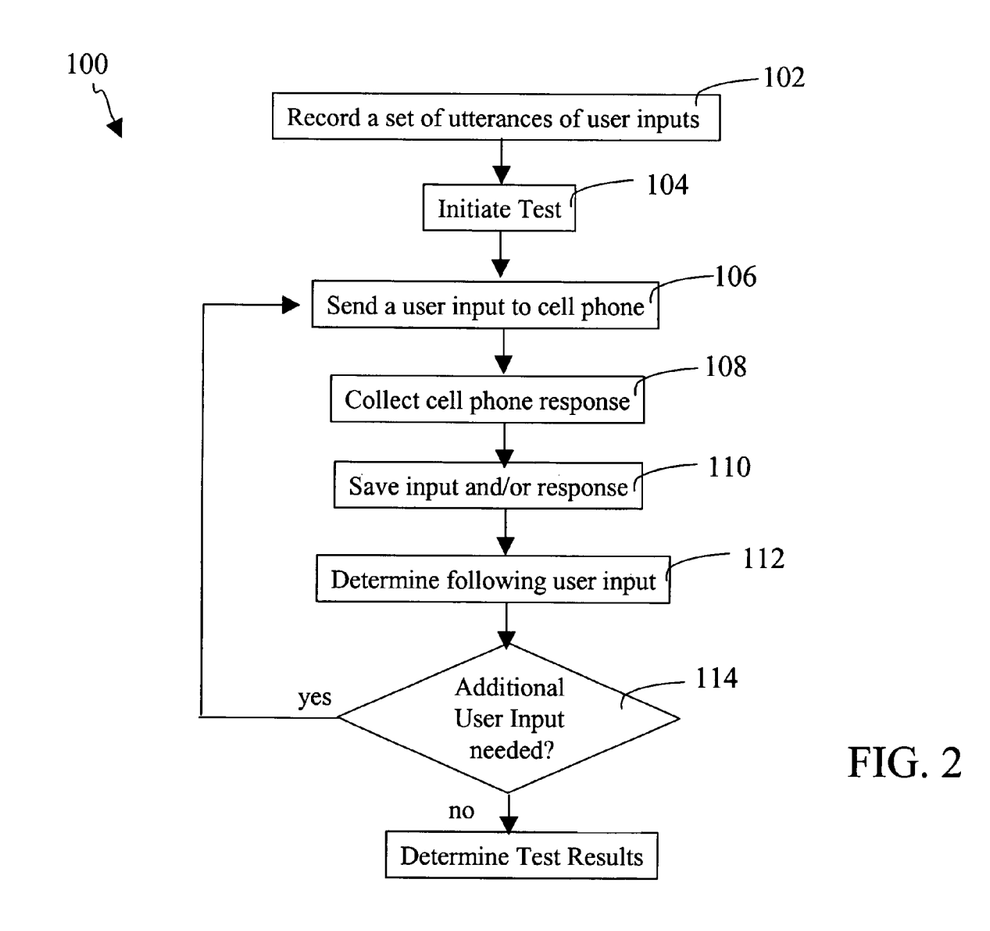
FIG. 2 is a flowchart of a process for testing voice recognition software on a cell phone.

Referring to FIG. 2, a process 100 does automated testing of voice recognition accuracy and performance. The process 100 includes recording (102) a set of utterances of user inputs. These inputs can include commands and user-supplied information. The utterances are recorded by persons using a variety of microphones under different testing conditions. These different testing conditions include a quiet room, in which case the testing system 3 can emulate a noisy environment by using noise source 14 during testing. These different testing conditions also include a noisy environment such that the noise of the environment is recorded along with the utterances of the persons. The persons can also have different accents from different countries.

The process 100 includes initiating (104) the test. Initiating (104) the test includes putting the cell phone 12 and the computer 4 in a condition for testing.

The process 100 then includes repeating a series of steps that include sending (106) a user input to the cell phone 12. The process 100 includes collecting (108) a response from the cell phone 12. The process 100 includes saving (110) the input and the response (if any). The process 100 includes determining (112) additional user input following the cell phone 12's response. This determining is done based on expected interactions between the user 52 and the cell phone 12 for a given voice enabled application. If (114) additional user input is needed, process 100 includes repeating sending (106) a user input to the cell phone 12.

Figure 2A:
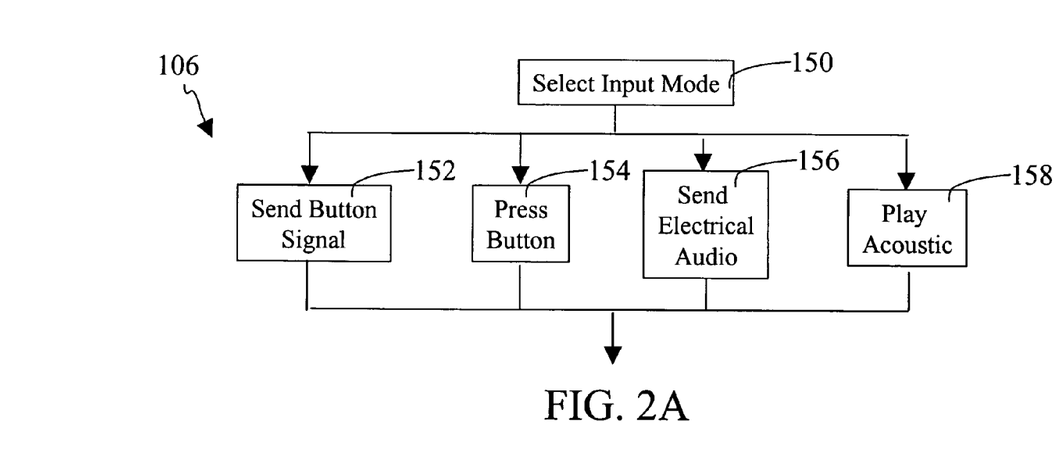
FIG. 2A is a chart of some possible methods for sending a user input to a cell phone for testing.

Referring to FIG. 2A, a process 106 includes selecting (150) an input mode for sending a user input to the cell phone 12 via speaker 8 or by connection 18. Depending on this selection, process 106 includes sending (152) an electronic communication transmission (e.g., a signal emulating a button press) to the cell phone 12. The process 106 can also include mechanically pressing (154) a button on keypad 64 of the cell phone 12. The process 106 can also include sending (156) an electrical audio signal directly to the cell phone 12. The process 106 can also include playing (158) an acoustic utterance 10 through the audio amplifier 6 and speaker 8.

Figure 2B:
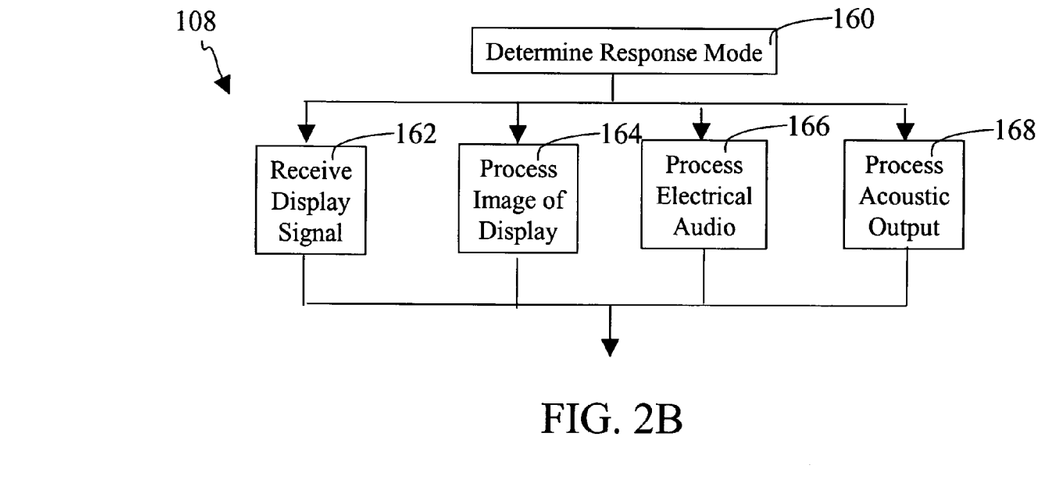
FIG. 2B is a chart of some possible methods for receiving a response from a cell phone for testing.

Referring to FIG. 2B, a process 108 includes determining (160) a mode for responding to the cell phone 12 via connection 20. Depending on this determination, the computer 4 receives (162) an electronic communication transmission indicating what is displayed on display 65. The process 108 also can include processing (164) an image of alphanumeric characters on the display 65. This image processing is done using a camera pointing at the display 65 and connecting the output of the camera to a video digitizer board on the computer 4. Image processing of this type is well understood because the cell phone 12 can be fixed in position and orientation relative to the camera and alphanumeric characters create structured images that are simple to process and recognize. The process 108 also can include processing (166) electrical signals corresponding to audio signals of prompt utterances generated by the cell phone 12. The processing includes recognizing the utterances generated by the cell phone 12. In many cases, recognizing the utterances generated by the cell phone 12 can be easier than recognizing utterances by humans because the cell phone 12 utterances are more predictable. The process 108 also includes processing (168) acoustic output by the cell phone 12. For processing (168) this acoustic output, the computer 4 recognizes the utterances by converting the acoustics into electric signals using a microphone and then by using speech recognition of the utterances as just described.

Figure 3:
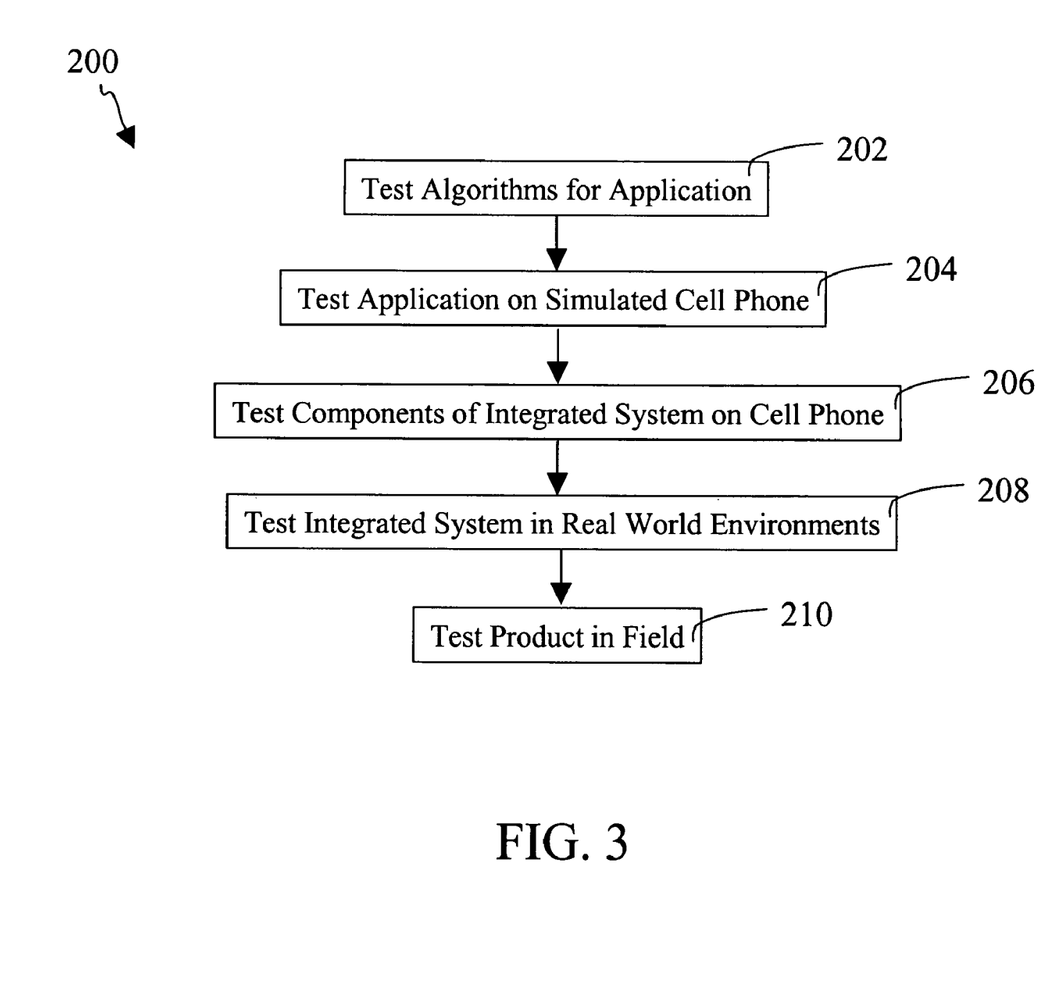
FIG. 3 is a flowchart of an overall testing process for voice recognition software on a cell phone.

Referring to FIG. 3, process 200 is a general software application testing approach that includes the testing by process 100. The process 200 includes testing (202) voice recognition algorithms offline on general purpose computers that are distinct from the cell phone 12. This testing (202) includes verification of the voice recognition algorithms to measure performance and error rates based on pre-recorded audio files.

The process 200 includes testing (204) a voice enabled application (e.g., 78, 80) on a simulated cell phone. The functionality of a cell phone 12 can be partially simulated on a desktop computer. Such a simulation generates a finite state machine approximation of the cell phone 12's behavior. Testing (204) verifies the functionality of the algorithm with user interaction without some of the variability of real environments.

The process 200 includes testing (206) components of the integrated system on the cell phone 12. Testing (206) uses a test program on a desktop computer to do automated and live testing on target hardware, stress testing, and application verification on the cell phone hardware. Testing (206) uses some components of testing environment 2 such as the computer 4, a test program, an artificial mouth (e.g., 8), and pneumatic fingers to automatically press keys on keypad 64 under control of computer 4.

The process 200 includes testing (208) the integrated system in real world acoustic environments as described above. Testing (208) includes measuring performance and accuracy of voice recognition algorithms used with voice-enabled applications on the cell phone 12. Testing (206) components of the integrated system and testing (208) the integrated system in real world environments can be done using the testing system 3.

The process 200 includes testing the cell phone 12 product in the field. Testing (210) the product in the field includes distributing cell phones 12 to real users and observing application behavior and user experience. Testing (210) further includes live, real-world testing over an extended period of time and measuring perceived accuracy, value, and satisfaction.

Figure 4:
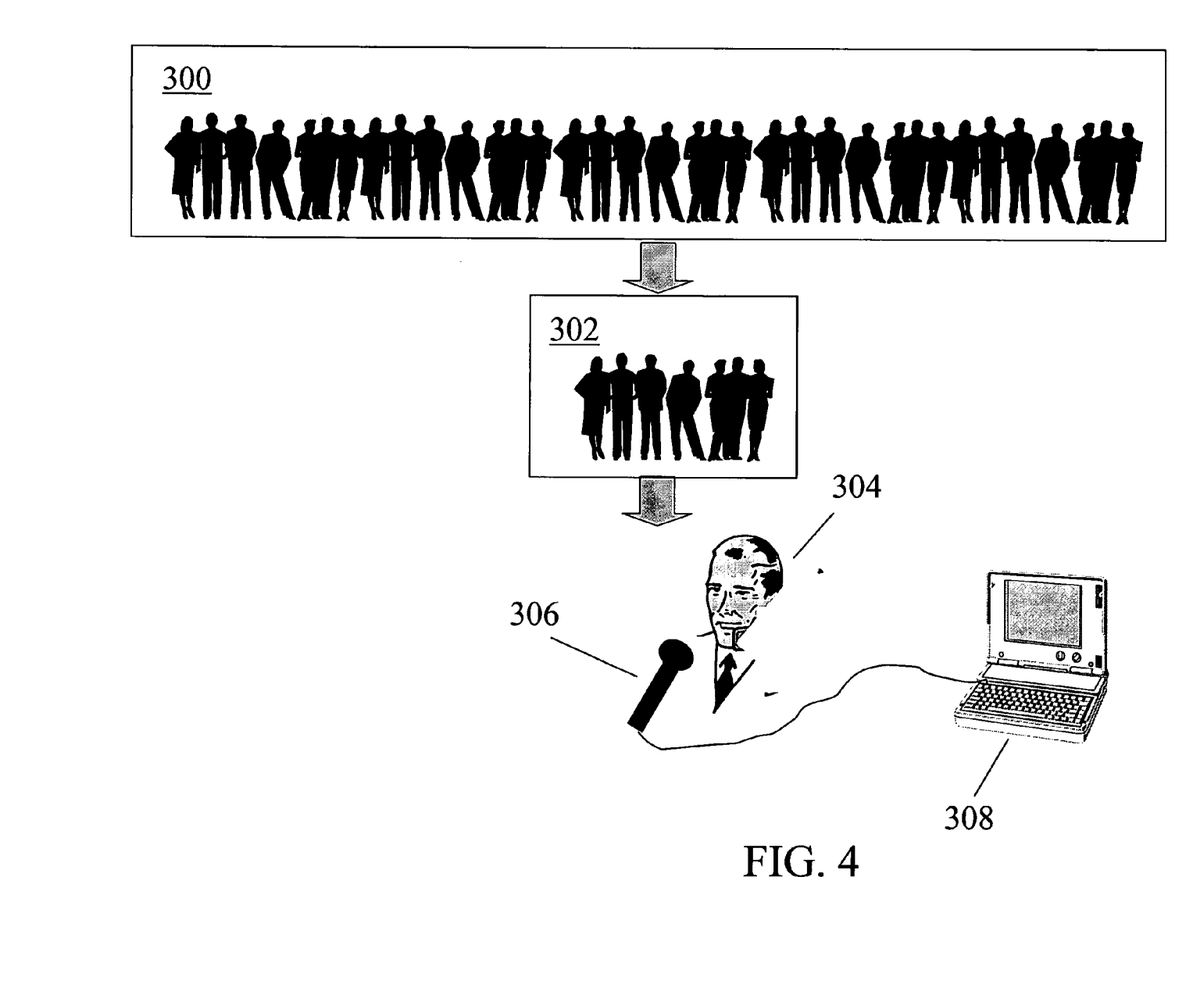
FIG. 4 is a view of population sampling used to determine individuals to record for utterances for user input to a cell phone for testing.

Referring to FIG. 4, the prerecorded utterances used for the testing system 3 are recorded (102) so that the prerecorded utterances accurately test the voice recognition on the cell phone 12. Out of a set 300 of potential customers, a random sample 302 is chosen. A test subject 304 records a set of utterances on a microphone 306. A recording device 308 converts the set of utterances into audio files.

For each type of recognition application (e.g., 78, 80) in the cell phone 12, there are types of data to collect from test subjects. For recognition of uttered commands, actual uttered commands are collected from test speakers. For recognition of uttered digit to be dialed, utterances of random digit strings are used. These random digit strings can be legitimate phone numbers for the customer locale. For recognition of uttered names, utterances of names (and suffixes such as "home", "work", etc.) are used. These names can be derived from test subjects' personal phone books.

Figure 5:
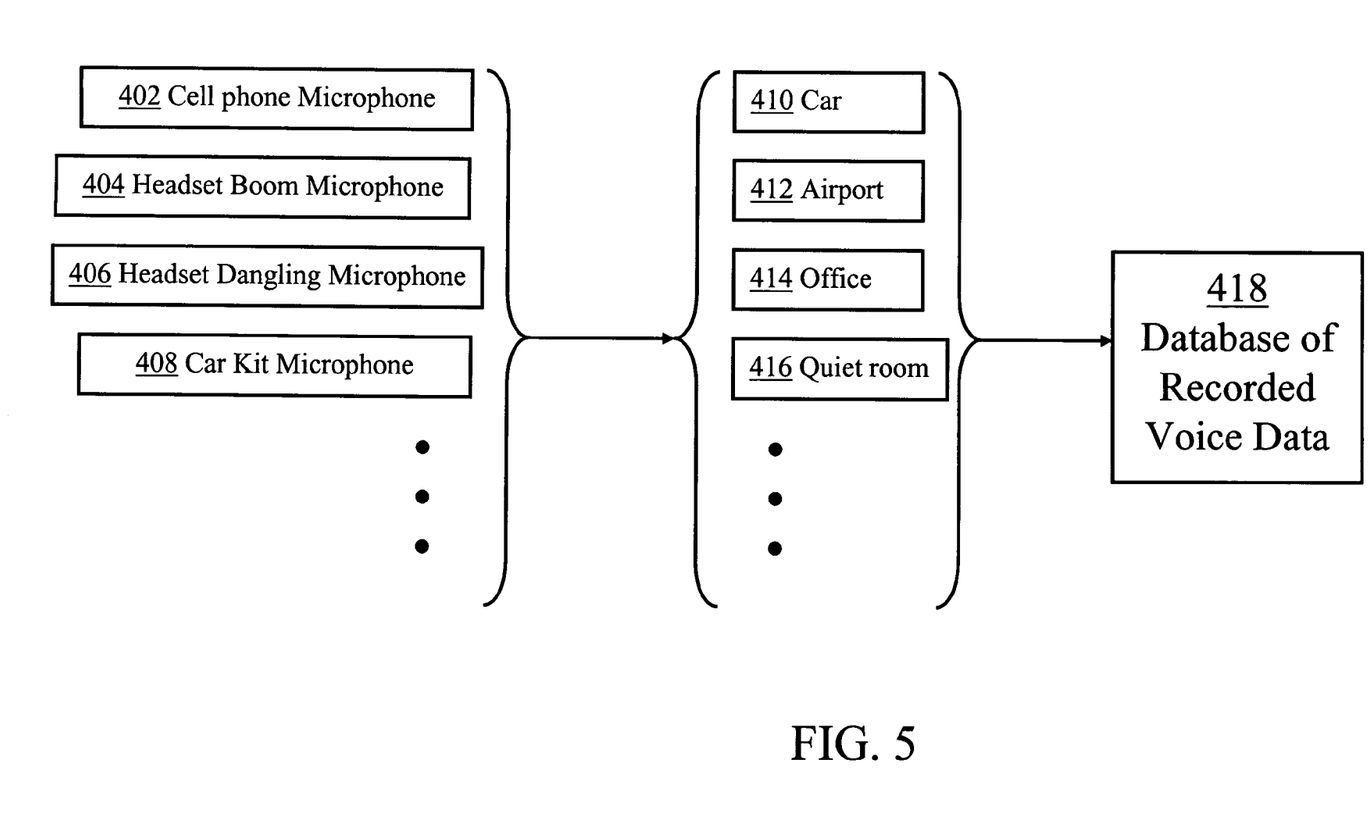
FIG. 5 is a view of possible alternate techniques used to record utterances for user input to a cell phone for testing.

Referring to FIG. 5, these prerecorded utterances can be recorded with different types of microphones having particular acoustic features. These types of microphones include a cell phone microphone 402, a headset boom microphone 404, a headset dangling microphone 406, and a car kit microphone 408. These utterances can be recorded in noisy environments with particular acoustic features such as a car 410, an airport 412, or an office 414. In some cases, these utterances are recorded in a quiet environment such as a quiet room 416. In these cases, noise 16 simulating an environment can be generated during testing by noise source 14.

All of these utterances are stored in a database 418 that is accessible to computer 4 during time of testing. The more variability that is tested, the more utterances are stored in the database 418. For example, if there are m types of microphones and n types of real or simulated environments, there are m×n possible recordings for the test subject 304. Other variability can be tested by changing how a test subject records using a particular microphone. For example, the test subject can move his or her head while speaking into the microphone.

Figure 6:
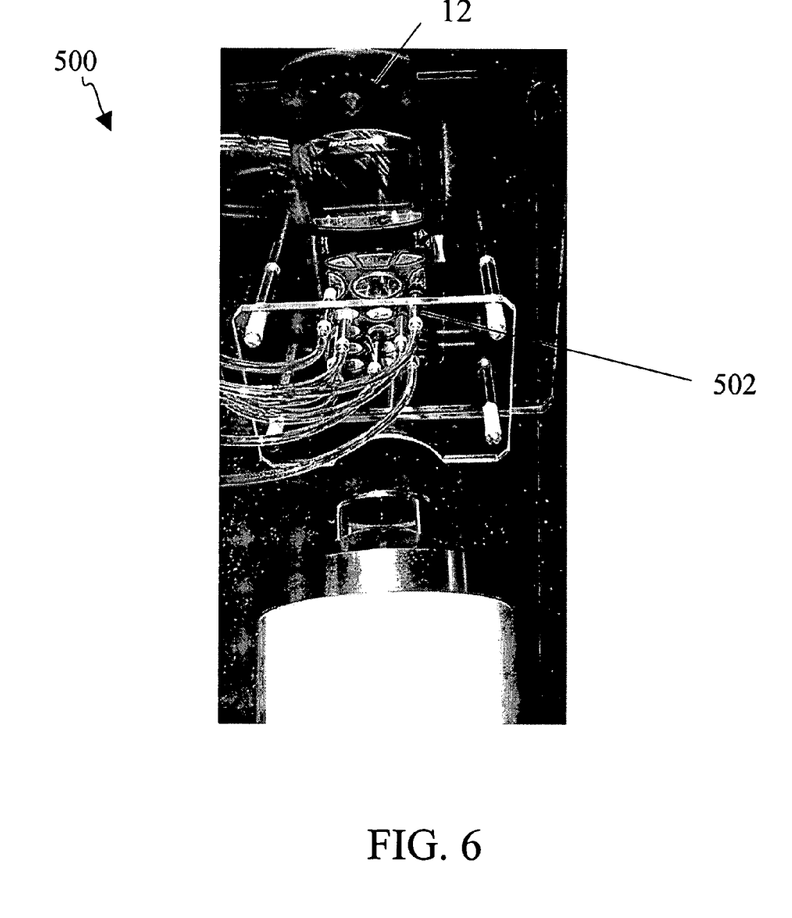
FIG. 6 is a picture of a testing apparatus for mechanically pushing buttons on a cell phone for testing.

Referring to FIG. 6, a test apparatus 500 automatically pushes keys on keypad 64 under control of computer 4. The test apparatus 500 uses pneumatic fingers 502 to push individual keys on the keypad 64. The pneumatic fingers 502 are mounted on a lexan plastic plate that enables the fingers 502 to be adjusted for different key patterns of keypads 64.

Figure 6A:
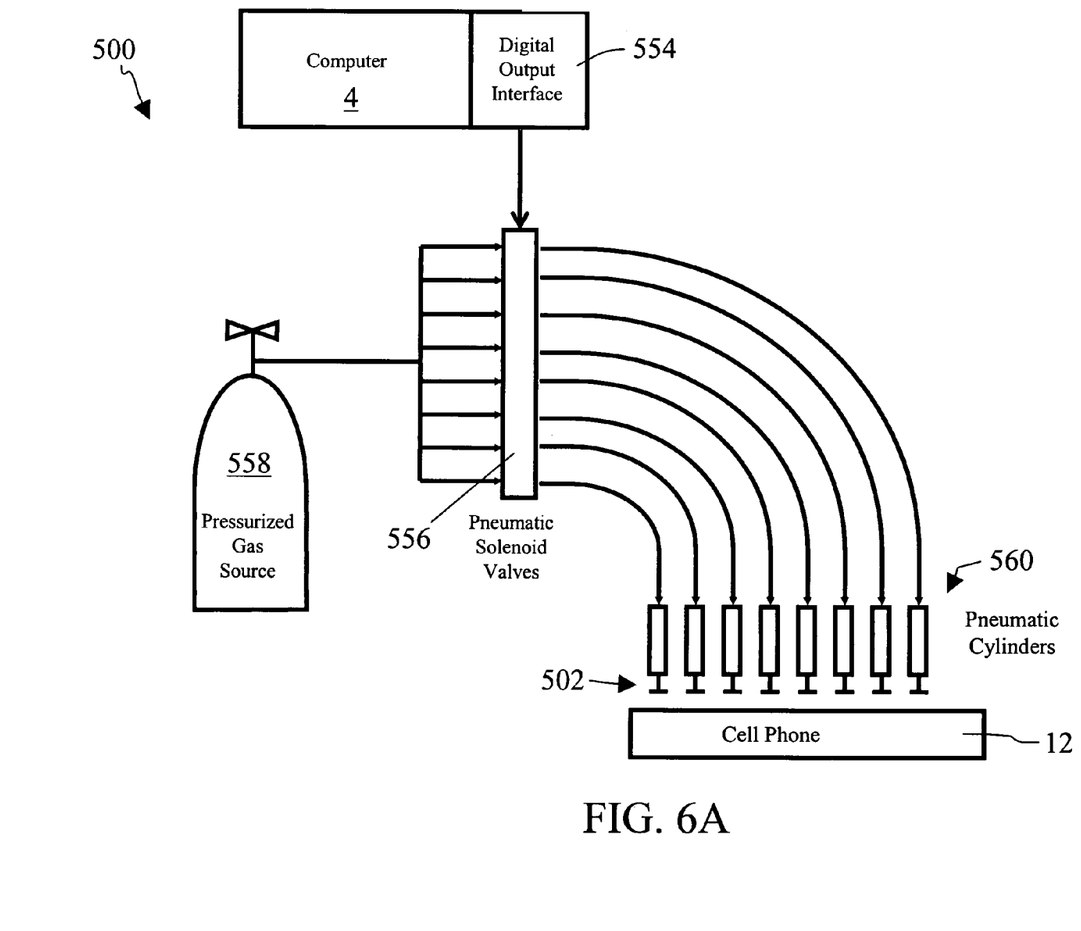
FIG. 6A is a block diagram of the testing apparatus of FIG. 6.

Referring to FIG. 6A, a test apparatus 500 includes a digital output interface 554 from computer 4 that controls a set of pneumatic solenoid valves 556. The pneumatic solenoid valves 556 are available as EE3-TL-24 from Clippard Instrument Laboratory, Inc of Cincinnati, Ohio. The pneumatic solenoid valves 556 use pressurized gas from gas source 558 to actuate a set of pneumatic cylinders 560. The gas source 558 can be, for example, a small air compressor. The pneumatic cylinders 560 are available as SM-2 from Clippard Instrument Laboratory, Inc. The pneumatic cylinders 560 move the pneumatic fingers 502. The digital output interface 554 is available as PCI7234 from Adlink Technology, Inc. of Taipei, Taiwan.

Figure 7:
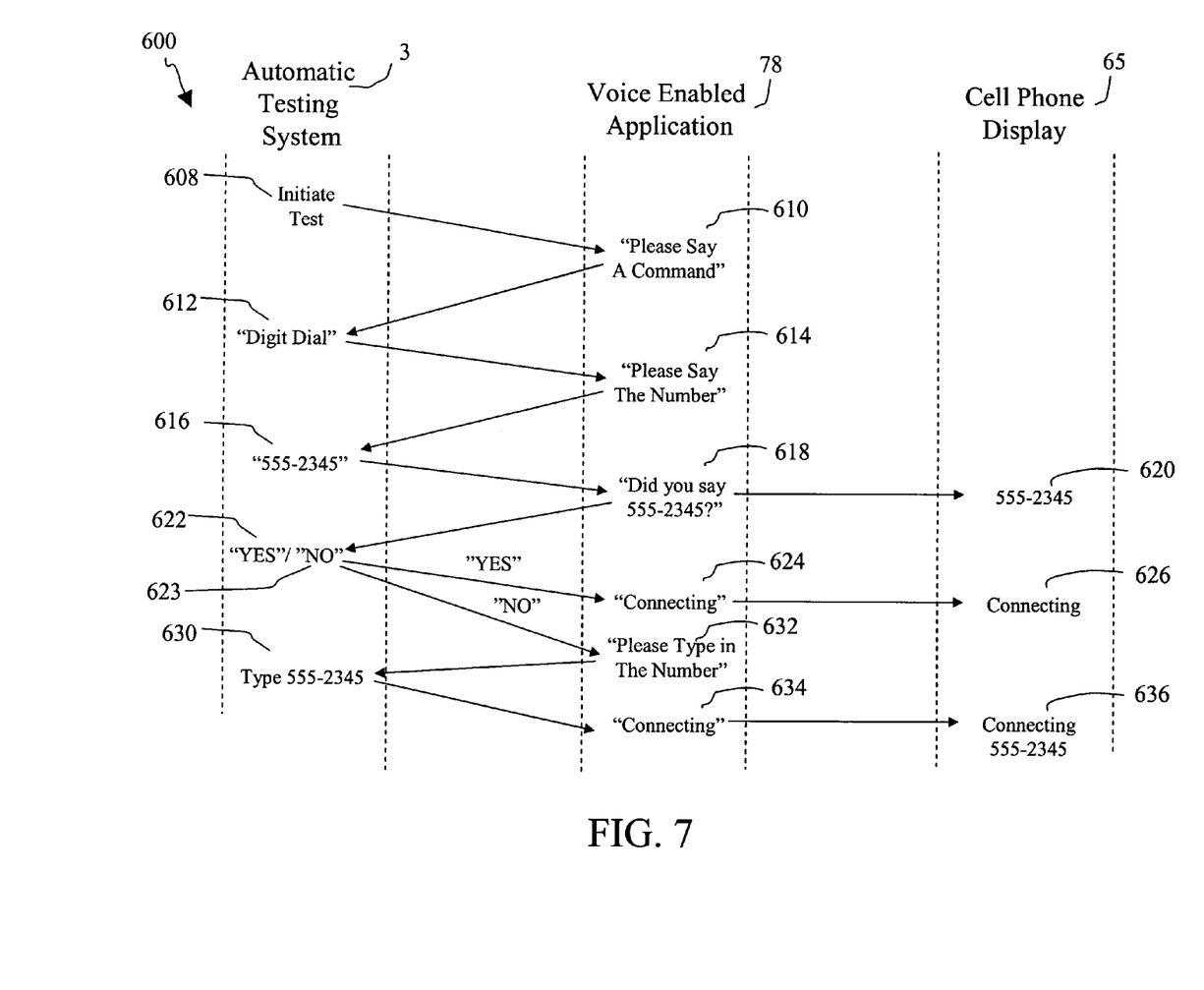
FIG. 7 is a sequence diagram representing interactions between an automatic testing system and a cell phone application using voice recognition.

Referring to FIG. 7, a process 600 is an example sequence of interactions between the testing system 3 and a voice enabled application 78 running on the cell phone 12. The testing system 3 initiates (608) the test. The voice enabled application 78 utters or sends a communication (610) with the message "Please Say A Command". The testing system 3 receives the message by recognizing the voice enabled application's utterance or reading a communication from the cell phone 12. The testing system 3 responds by sending (612) audio to the speaker 8 with the utterance "Digit Dial". The voice enabled application 78 recognizes the testing system's utterance and utters or sends a communication (614) with the message "Please Say The Number". The testing system 3 receives the message by recognizing the voice enabled application's utterance or reading a communication from the cell phone 12. The testing system 3 responds by sending (616) audio to the speaker 8 with the utterance "555-2345". The voice enabled application 78 recognizes the testing system's utterance as "555-2345" and utters, displays, or sends a communication (618) with the message "Did You Say 555-2345?". At the same time, the voice enabled application 78 displays (620) the text "555-2345" on the display 65. The testing system 3 receives the message by recognizing the voice enabled application's utterance or by reading a communication from the cell phone 12 or by processing the image of the display 65.

If the message is correct, the testing system 3 sends (622) audio to the speaker 8 with the utterance "YES". In this first case, the voice enabled application 78 utters and sends a communication (624) with the message "Connecting". At the same time, the voice enabled application 78 displays (626) the message "Connecting" on the display 65. The testing system 3 receives the message by recognizing the voice enabled application's utterance or reading a communication from the cell phone 12 or processing the image of the display 65.

If the message was incorrect, the testing system 3 sends (623) audio to the speaker 8 with the utterance "NO". In this second case, the voice enabled application 78 utters and sends a communication (632) with the message "Please Type in the Number". The testing system 3 receives the message by recognizing the voice enabled application's utterance or reading a communication from the cell phone 12 or processing the image of the display 65. The testing system 3 pushes keys or sends a communication (630) with the numbers 555-2345. In this second case, the voice enabled application 78 utters and sends a communication (634) with the message "Connecting". At the same time, the voice enabled application 78 displays (636) the message "Connecting 555-2345" on the display 65. The testing system 3 receives the message by recognizing the voice enabled application's utterance or reading a communication from the cell phone 12 or processing the image of the display 65.

A number of embodiments of the invention have been described. Nevertheless, it will be understood that various modifications may be made without departing from the spirit and scope of the invention. For example, in some embodiments, the target device (e.g., cell phone 12) is a personal digital assistant (PDA) equipped with audio input or a computer with a user interface having audio input. Accordingly, other embodiments are within the scope of the following claims.

What is claimed is:

1. A method for testing a voice enabled application on a target device, the method comprising conducting one or more interactions with the target device, at least some of the interactions comprising:

selecting one of a plurality of input modes for sending input to the target device;

presenting an acoustic utterance in an acoustic environment to the target device, including presenting a noise signal to the target device, using the selected input mode;

determining one of a plurality of response modes for responding to an output of the target device;

receiving an output of the target device in response to the acoustic utterance and the noise signal according to the determined response mode; and comparing the output to an output expected from the acoustic utterance;

wherein the selected input mode and the determined response mode depend on input/output capabilities of the target device wherein presenting the acoustic utterance further comprises generating the acoustic utterance using an acoustic speaker;

wherein the speaker comprises an artificial human mouth;

wherein the acoustic environment is produced using an acoustic noise source that generates the noise signal, the noise signal representing one or more environmental noises of a natural environment.

2. The method of claim 1, wherein the acoustic utterance and the expected output are further determined by simulating a dialog by a user of the application with the target device.

3. The method of claim 2, wherein the dialog has a plurality of allowable interactions.

4. The method of claim 1, wherein at least some of the interactions comprise providing a keyboard input to the target device.

5. The method of claim 4, wherein the keyboard input comprises an electrical communications signal to the target device.

6. The method of claim 4, wherein the keyboard input comprises a mechanical-pneumatic force exerted on buttons of the target device.

7. The method of claim 1, wherein receiving the output further comprises receiving an electric communications signal from the target device.

8. The method of claim 1, wherein receiving the output further comprises receiving an image of alphanumeric characters from the target device.

9. The method of claim 8 further comprising processing and recognizing the image of alphanumeric characters from the target device.

10. The method of claim 9 further comprising processing and recognizing the acoustic output from the target device.

11. The method of claim 1, wherein receiving the output further comprises receiving an acoustic output from the target device.

12. The method of claim 1 further comprising recording the acoustic utterance.

13. The method of claim 12, wherein recording the acoustic utterance further comprises recording the acoustic utterance in one of: a car, an airport, an office, a shaking room, and a quiet room.

14. The method of claim 12, wherein recording the acoustic utterance further comprises recording the acoustic utterance of a person using a microphone.

15. The method of claim 14 wherein the microphone comprises one of a group consisting of one of: an in-device microphone, a headset boom microphone, a headset dangling microphone, and a car kit microphone.

16. The method of claim 14 wherein the person utters the acoustic utterance while the microphone is shaking.

17. The method of claim 14 wherein the person utters the acoustic utterance while the person varies his or her position relative to the microphone.

18. The method of claim 1 wherein the target device is a cell phone or a personal digital assistant.

19. The method of claim 1 wherein the target device is a desktop computer.

20. The method of claim 1 further comprising:
testing and verifying algorithms for the voice enabled application offline of the target device;
testing the application on a simulator of the target device; and
distributing target devices to real users and observing application behavior and user experience.

21. The method of claim 1, wherein the noise signal comprises an acoustic noise signal that emulates one of multiple different types of noise.

22. The method of claim 1, wherein a first input mode comprises an electrical signal over a connection from a computer, a second input mode comprises an acoustic signal from a speaker, a first response mode comprises receiving the output as an electrical signal over a connection from the device, and a second response mode comprises recognizing the output from a screen or speaker of the device.

23. The method of claim 1, wherein a first input mode comprises a recorded utterance from a first audio file and a noise signal from a second audio file, and a second input mode comprises an acoustic utterance from a first speaker and a noise signal from a second speaker.

24. The method of claim 1, wherein the acoustic environment comprises a quiet room, and the noise signal is derived from an audio file.

25. A system for testing a voice enabled application on a target device, the system comprising:
the target device;
a speaker configured to send sound to the target device;
a noise source configured to send a noise signal to the target device;
wherein the noise source comprises an acoustic noise source configured to generate the noise signal to produce the acoustic environment, the acoustic noise source replicating one or more noises of a real environment;
a computer configured to conduct one or more interactions with the target device, including selecting one of a plurality of input modes for sending input to the target device and determining one of a plurality of response modes for responding to an output of the target device, at least some of the interactions comprising:
sending commands to the target device using the selected input mode and receiving communications from the target device using the determined response mode;
presenting an acoustic utterance in an acoustic environment to the target device;
receiving an output of the target device in response to the acoustic utterance;
comparing the output to an output expected from the acoustic utterance
wherein the selected input mode and the determined response mode depend on input/output capabilities of the target device;
wherein presenting the acoustic utterance further comprises generating the acoustic utterance using the speaker;
wherein the speaker is an artificial human mouth.

26. The system of claim 25, wherein the acoustic utterance and the expected output are further determined by simulating a dialog with a user of the application on the target device.

27. The system of claim 26, wherein the dialog has a plurality of allowable interactions.

28. The system of claim 25 wherein the target device is a cell phone or a personal digital assistant, wherein the acoustic environment is produced using an acoustic noise source that generates the noise signal, the noise signal representing one or more environmental noises of a natural environment.

29. The system of claim 25 wherein the target device is a desktop computer.

30. The system of claim 25, wherein sending commands comprises sending a keyboard input to the target device.

31. The system of claim 30, wherein the keyboard input is an electrical communications signal to the target device.

32. The system of claim 30, wherein the keyboard input is a mechanical-pneumatic force exerted on buttons of the target device.

33. The system of claim 25, wherein receiving the output further comprises receiving an electric communications signal from the target device.

34. The system of claim 25, wherein receiving the output further comprises receiving an image of alphanumeric characters from the target device.

35. The system of claim 34, wherein at least some of the interactions further comprise processing and recognizing the image of alphanumeric characters from the target device.

36. The system of claim 34, wherein at least some of the interactions further comprise processing and recognizing the acoustic output from the target device.

37. The system of claim 25, wherein receiving the output further comprises receiving an acoustic output from the target device.

38. The system claim 25, wherein presenting the acoustic utterance further comprises recording the acoustic utterance.

39. The system of claim 38, wherein recording the acoustic utterance further comprises recording the acoustic utterance in one of: a car, an airport, an office, a shaking room, and a quiet room.

40. The system of claim 38, wherein recording the acoustic utterance further comprises recording the acoustic utterance of a person using a microphone.

41. The method of claim 40 wherein the microphone is one of: an in-device microphone, a headset boom microphone, a headset dangling microphone, and a car kit microphone.

42. The system of claim 40 wherein the person utters the acoustic utterance while the microphone is shaking.

43. The system of claim 40 wherein the person utters the acoustic utterance while the person varies his or her position relative to the microphone.

44. The system of claim 25, wherein the noise source comprises an acoustic noise source configured to generate an acoustic noise signal that emulates one of multiple different types of noise.

45. The system of claim 25, wherein a first input mode comprises an electrical signal over a connection from a computer, a second input mode comprises an acoustic signal from a speaker, a first response mode comprises receiving the output as an electrical signal over a connection from the device, and a second response mode comprises recognizing the output from a screen or speaker of the device.

* * * * *